No. 788,421. Patented April 25, 1905.

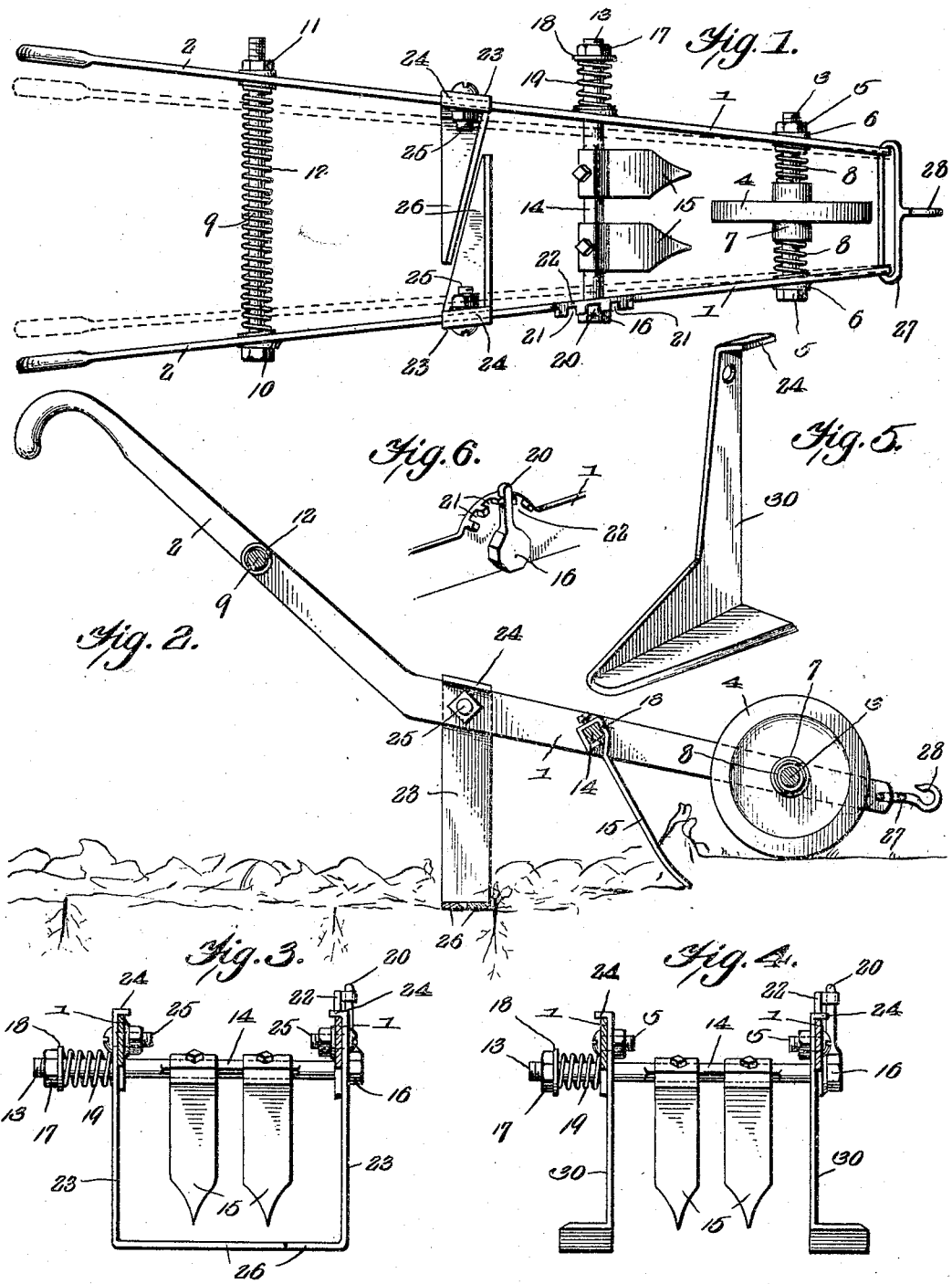

UNITED STATES PATENT OFFICE.

MICHAEL McINNERNY, OF IOWA CITY, IOWA.

CULTIVATOR.

SPECIFICATION forming part of Letters Patent No. 788,421, dated April 25, 1905.

Application filed January 4, 1905. Serial No. 239,623.

*To all whom it may concern:*

Be it known that I, MICHAEL MCINNERNY, a citizen of the United States, residing at Iowa City, in the county of Johnson and State of Iowa, have invented a new and useful Cultivator, of which the following is a specification.

This invention relates to cultivating implements of that class which are generally known as "walking-cultivators," which operate between two rows of plants and which are operated by a single draft-animal.

The invention has for its object to simplify and improve the construction and operation of this class of devices, to provide the device with weed-cutting implements that operate below the surface of the ground for the purpose of severing the roots of grass and weeds, to connect the parts of the device flexibly in such a manner as to be under the complete control of the operator who walks behind the machine and guides the same, and to provide various earth-engaging implements to be used interchangeably in connection with the frame of the machine.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that changes, alterations, and modifications may be made within the scope of the invention and without departing from the spirit or sacrificing the efficiency of the same.

In said drawings, Figure 1 is a top plan view of a cultivator constructed in accordance with the principles of the invention. Fig. 2 is a side elevation of the same. Fig. 3 is a transverse sectional view taken in rear of the weed-cutters and looking in a forward direction. Fig. 4 is a transverse sectional view showing shovels substituted for the weed-cutters. Fig. 5 is a perspective detail view showing one of the shovels detached. Fig. 6 is a perspective detail view.

Corresponding parts in the several figures are indicated by like characters of reference throughout.

The frame of the improved device is composed of two side members or beams 1 1, the rear ends of which are extended upwardly to form handles 2 2. The front ends of the beams or side pieces afford bearings for a shaft or axle 3, carrying a ground-engaging wheel 4, which is disposed centrally upon said shaft, the ends of the latter being provided with nuts and washers 5 6, bearing against the outer sides of the beam. Between the inner sides of the beams and the hub 7 of the wheel 4 are interposed springs 8, which are preferably coiled upon the shaft or axle 3.

The handles 2 2 are apertured for the passage of a rung 9, consisting of a headed and screw-threaded rod or bolt, the head of which, 10, is disposed adjacent to the outer side of one of the beams, while the nut 11 is disposed adjacent to the outer side of the opposite beam. A spring 12 is coiled upon the rung between the beams or handles, which are thus spaced apart, the degree of pressure being capable of regulation by proper adjustment of the nut 11.

The side pieces of the frame are provided with apertures for the passage of a cross-bar 13, having an intermediate squared portion 14, to which one or more earth-engaging cultivating members 15 may be suitably secured, it being understood that the number, shape, and means for the attachment of said members may be varied within the scope of the invention. The ends of the cross-bar 13 are rounded, and one end is provided with a head 16 and the other end with a nut 17, adjacent to which is a washer 18, between which and the adjacent beam 1 a spring 19 is interposed. The end of the member 13 having the head 16 is provided with a short arm 20, which is capable of engaging any one of a series of notches 21 in a segment-plate 22, connected with the beam 1, adjacent thereto. It will be seen that by moving the member 13 against the tension of the spring 19 the arm 20 will become disengaged from the notched segment-plate 22, thus permitting the members 15 to be adjusted to various degrees of inclination, at any of which they will be securely retained by permitting the member 13 to spring back until the arm 20 again engages the notched segment-plate.

A pair of shanks 23, provided at their upper edges with flanges 24, engaging the upper edges of the beams, are secured to said beams by means of bolts 25. The lower ends of said shanks are provided with cutters 26, extending laterally in an inward direction and breaking joints with each other, as clearly shown in Fig. 1. These cutters are preferably triangular in shape, as shown, and sharpened at their front edges, so that they may be placed in close relation to, without interfering with, one another, said cutters being disposed in practically the same horizontal plane.

The front ends of the beams 1 1 are connected by means of a link 27, having a hook 28 for the attachment of the draft.

In operation the beams 1 1, including the handles 2 2, may be spaced various distances apart by loosening or tightening the nuts 5 5 and 11, the springs 8 and 9 serving to force said beams and handles apart against the tension of the spring 19. The earth-engaging members 15 may be mounted in any desired relative position upon the non-circular portion 14 of the transverse member 13. Said earth-engaging members are designed to stir the soil between the rows of plants, while the cutters 26 are adjusted to work several inches beneath the surface of the soil, thus cutting the roots of grass and weeds, which will thus be destroyed and eradicated. By exerting lateral pressure upon the handles the beams may be forced in the direction of each other when necessary in order to avoid interference with plants that are out of alinement with the remainder of the row. The two side members of the frame are movable independently of each other within reasonable limits, thus enabling the operator to manipulate the device according to varying conditions of the ground and the crop.

When the crops begin to mature, the weed-cutters are detached from the side members of the frame and in place thereof are mounted shovels 30, as indicated in Figs. 4 and 5 of the drawings, said shovels operating to raise the soil from between the rows and to drop it in the direction of the roots of the plants. These shovels may, if desired, be used in connection with the weed-cutters; but the latter will not usually be necessary when the crop has attained the stage of growth at which the shovel members 30 are required.

The construction of this improved cultivating implement, as will be seen from the foregoing description, is simple and inexpensive, is effective in operation, and easily manipulated to bring about the desired results.

Having thus described the invention, what is claimed is—

1. In a cultivating implement, a frame including two side members extended to form handles, a wheel-bearing shaft and a rung connecting said side members, springs upon said shaft and rung serving to force the side members apart from each other, and tightening-nuts upon said shaft and rung.

2. In a cultivating implement, a frame including adjustably-connected side members and spring means to force said side members from each other, a cross-bar extending through apertures in the side members, and earth-engaging members upon said cross-bar.

3. In a cultivating implement, a frame including adjustably-connected side members and spring means to force said side members apart from each other, a cross-bar extending through apertures in the side members, earth-engaging members upon said cross-bar, and spring means for retaining the latter in normal operative position.

4. In a cultivating implement, a frame including adjustably-connected side members and spring means to force said side members apart from each other, a cross-bar mounted for oscillation in said side members, an adjusting-nut upon said cross-bar, a spring between said nut and the outer side of the adjacent frame member, an arm extending from the rocking cross-bar, and a notched segment-plate engaging said arm.

5. In a cultivating implement, a frame including adjustably-connected side members and spring means to force said side members apart from each other, a cross-bar adjustably engaging said side members and carrying earth-engaging implements, and a link connecting the front ends of the side members of the frame and having a draft-hook.

6. In a cultivating implement, a frame consisting of flexibly-connected side members, in combination with a cross-bar mounted for oscillation and carrying earth-engaging implements, means for retaining said cross-bar at various adjustments, and shanks connected with the side members of the frame and provided with inwardly-extending weed-cutters disposed in the same horizontal plane and breaking joints with each other.

In testimony that I claim the foregoing as my own I have hereto affixed my signature in the presence of two witnesses.

MICHAEL McINNERNY.

Witnesses:
F. B. VOLKRINGER,
W. J. FREEMAN.